(12) United States Patent
Nyström

(10) Patent No.: US 11,230,216 B2
(45) Date of Patent: Jan. 25, 2022

(54) METHOD AND SYSTEM FOR DETERMINING THE LENGTH OF A DEMOUNTABLE PLATFORM

(71) Applicant: HIAB AB, Kista (SE)

(72) Inventor: Mikko Nyström, Poikko (FI)

(73) Assignee: HIAB AB, Kista (SE)

( * ) Notice: Subject to any disclaimer, the term of this patent is extended or adjusted under 35 U.S.C. 154(b) by 106 days.

(21) Appl. No.: 16/575,435

(22) Filed: Sep. 19, 2019

(65) Prior Publication Data

US 2020/0094725 A1    Mar. 26, 2020

(30) Foreign Application Priority Data

Sep. 20, 2018 (EP) .................................... 18195702

(51) Int. Cl.
*B60P 1/64* (2006.01)
*G01B 5/02* (2006.01)
*B60P 1/48* (2006.01)

(52) U.S. Cl.
CPC ............ *B60P 1/6427* (2013.01); *B60P 1/483* (2013.01); *B60P 1/6463* (2013.01); *G01B 5/02* (2013.01)

(58) Field of Classification Search
CPC ....... B60P 1/6427; B60P 1/6463; B60P 1/483; G01B 5/02; G01B 1/00; G01B 3/02
See application file for complete search history.

(56) References Cited

U.S. PATENT DOCUMENTS

| X670356 | | 3/1901 | Finley |
|---|---|---|---|
| 3,857,452 | A | 12/1974 | Hartman |
| 3,971,451 | A | 7/1976 | Norberg |
| 4,347,903 | A | 9/1982 | Yano |
| 5,070,953 | A | 12/1991 | Kyrtsos |
| 5,290,138 | A | 3/1994 | Smart |
| 5,509,293 | A | 4/1996 | Karumanchi |
| 5,601,393 | A | 2/1997 | Waldschmitt |
| 5,929,389 | A | 7/1999 | Keuper |
| 8,716,609 | B2 | 5/2014 | Pangrazio |
| 9,534,948 | B2 * | 1/2017 | Lustenberger ......... G01G 19/12 |
| 10,583,766 | B2 | 3/2020 | Baldys |
| 2010/0161185 | A1 | 6/2010 | Marathe |
| 2011/0196623 | A1 * | 8/2011 | Hakkinen ............. G01M 1/122 702/41 |

(Continued)

FOREIGN PATENT DOCUMENTS

| DE | 4140344 A1 | 6/1993 |
|---|---|---|
| EP | 1702792 A2 | 9/2006 |

(Continued)

*Primary Examiner* — James Keenan
(74) *Attorney, Agent, or Firm* — Merchant & Gould P.C.

(57) ABSTRACT

The present invention relates to a method for determining the length of a demountable platform. In the method, a hooklift is used to lift the demountable platform from the ground onto a vehicle, magnitudes of one or more physical quantities related to a position of the hooklift are determined at a moment when the demountable platform comes into contact with rear rollers of the hooklift, and the length of the demountable platform is calculated based on the determined magnitudes of the one or more physical quantities and the position and orientation information of the hooklift relative to the ground. The present invention also relates to a system for determining the length of a demountable platform.

13 Claims, 3 Drawing Sheets

(56) References Cited

U.S. PATENT DOCUMENTS

| | | |
|---|---|---|
| 2013/0062127 A1 | 3/2013 | Pangrazio |
| 2014/0069728 A1 | 3/2014 | Lustenberger |
| 2016/0116328 A1 | 4/2016 | Kivi |
| 2020/0096381 A1 | 3/2020 | Siren |

FOREIGN PATENT DOCUMENTS

| | | |
|---|---|---|
| EP | 1702792 A2 | 5/2011 |
| EP | 3141420 A1 | 3/2017 |
| EP | 3141420 A1 | 10/2019 |
| GB | 2461273 A | 12/2009 |
| JP | 108233640 A | 9/1996 |
| WO | 2008/028993 A1 | 3/2008 |
| WO | 2008028993 A1 | 3/2008 |

* cited by examiner though, the length of the demountable platform, the rear

METHOD AND SYSTEM FOR DETERMINING THE LENGTH OF A DEMOUNTABLE PLATFORM

PRIORITY

This application claims priority of European patent application number 18195702.8 filed on Sep. 20, 2018 the contents of which are fully incorporated herein by reference.

TECHNICAL FIELD OF THE INVENTION

The present invention relates to a method and system for determining the length of a demountable platform according to the preambles of the appended independent claims.

BACKGROUND OF THE INVENTION

Hooklifts are widely used in vehicles, such as trucks to quickly and easily handle demountable platforms. Hooklifts can perform several work tasks, such as loading, unloading, tipping and lowering of demountable platforms.

A problem associated with known hooklifts relates to the positioning of a demountable platform on a tipping frame of the hooklift. The positioning of the demountable platform on the tipping frame is done with a sliding frame that is moved relative to a middle frame of the tipping frame. The correct position of the sliding frame depends on the length of the demountable platform. If the demountable platform is not moved far enough forward on the tipping frame, the rear overhang is too large. On the other hand, if the demountable platform is moved too far forward on the tipping frame, the demountable platform drops from rear rollers of the hooklift. The correct positioning of the demountable platform is also important with respect to the locking of the demountable platform to the hooklift for the time of transportation.

In known hooklifts, the positioning of the demountable platform on the tipping frame is done manually by a driver who first visually estimates the length of the demountable platform and then moves with the sliding frame the demountable platform into the desired position on the tipping frame. This is time-consuming, and there is a considerable risk that the demountable platform is not positioned correctly.

SUMMARY OF THE INVENTION

It is the main objective of the present invention to reduce or even eliminate the prior art problems presented above.

It is an objective of the present invention to provide a method and system for determining the length of a demountable platform. In more detail, it is an objective of the invention to provide a method and system enabling to determine the length of a demountable platform during the lifting of the demountable platform from the ground onto a vehicle. It is a further objective of the invention to provide a method and system enabling to quickly and easily determine the length of a demountable platform.

In order to realise the above-mentioned objectives, the method and system according to the invention are characterised by what is presented in the characterising portions of the appended independent claims. Advantageous embodiments of the invention are described in the dependent claims.

A method for determining the length of a demountable platform according to the invention comprises using a hooklift to lift the demountable platform from the ground onto a vehicle, determining a moment when the demountable platform comes into contact with rear rollers of the hooklift, determining, at said moment, magnitudes of one or more physical quantities related to a position of the hooklift, and calculating the length of the demountable platform using the determined magnitudes of the one or more physical quantities and the position and orientation information of the hooklift relative to the ground.

In the method according to the invention the length of the demountable platform is determined during the lifting of the demountable platform from the ground onto the vehicle. The method is based on determining magnitudes of one or more physical quantities related to the position of the hooklift at the moment the demountable platform touches the rear rollers of the hooklift and then calculating the length of the demountable platform based on these magnitudes and the position and orientation information of the hooklift relative to the ground.

The moment when the demountable platform comes into contact with the rear rollers of the hooklift can be determined in various ways. One exemplary way is to determine, during the lifting of the demountable platform, the force acting on a main cylinder of the hooklift. The touching of the demountable platform to the rear rollers generates an abrupt change in this force. By detecting this abrupt change, the moment when the demountable platform comes into contact with the rear rollers can be determined. The force acting on the main cylinder, i.e. the load force of the main cylinder, can be determined, for example, based on pressures in a bottom chamber and a piston rod chamber of the main cylinder, a pressure in a hydraulic pump of a hydraulic system that is connected to and used to control the main cylinder, or a strain in the main cylinder. Another exemplary way to determine the moment when the demountable platform comes into contact with the rear rollers of the hooklift is to monitor, during the lifting of the demountable platform, the rotation of the rear rollers. Other exemplary ways to determine the moment when the demountable platform comes into contact with the rear rollers of the hooklift can be based on using suitable optical or acoustical means, such as sensors.

In the method according to the invention the magnitudes of the one or more physical quantities related to the position of the hooklift are determined at the moment the demountable platform comes into contact with the rear rollers of the hooklift. By a physical quantity related to the position of the hooklift is meant a physical quantity that varies as one or more parts of the hooklift are moved. Preferably, a physical quantity is such that its magnitude varies as a function of the main cylinder movement. Examples of physical quantities related to the position of the hooklift are a position of the piston rod of the main cylinder, an angle between the middle frame and the subframe of the hooklift, an angle between the piston rod of the main cylinder and the middle frame of the hooklift, and a position of a hook of the hooklift. The number of physical quantities that are used in the method according to the invention can be, for example, one, two, three or four.

In the method according to the invention the length of the demountable platform is calculated by using the determined magnitudes of the one or more physical quantities and the position and orientation information of the hooklift relative to the ground. The calculation of the length of the demountable platform is based on trigonometric calculations, which depend on the determined physical quantities. In addition to the position and orientation information of the hooklift relative to the ground, it is also possible to use physical dimensions of the hooklift in the calculations. The position and orientation information of the hooklift relative to the ground can be prestored and/or it can be determined with various sensors, such as a distance sensor.

The calculation of the length of the demountable platform can be implemented in hardware, software, or a combination of hardware and software components. Hardware components may comprise a processor for processing data and a storage medium for storing the data. Software components may be in the form of computer-readable program code stored in a computer-readable storage medium such as memory, mass storage device, or removable storage device. For example, a computer-readable medium may comprise computer-readable code for performing the function of a particular component. Likewise, computer memory may be configured to include one or more components, which may then be executed by a processor. Components may be implemented separately in multiple modules or together in a single module.

The method according to the invention can be applied in a hooklift that is attached to a vehicle, such as a truck, for handling a demountable platform. Such a hooklift comprises a tipping frame, which is connected through a tipping joint to a subframe of the hooklift. The tipping frame is arranged to be moved relative to the subframe by one or more main cylinders, which can be, for example, double-acting differential cylinders. The main cylinder(s) of the hooklift is(are) controlled with a hydraulic system. The bottom side of the main cylinder is attached to the subframe and the piston rod of the main cylinder is attached to the tipping frame. The subframe is attached to a chassis of the vehicle.

The tipping frame of the hooklift comprises a sliding frame, a middle frame and a rear frame. The sliding frame comprises a hook with which the hooklift can releasably attach to the demountable platform. The sliding frame is connected to the middle frame in such a manner that part of the sliding frame is arranged inside the middle frame, and that the sliding frame can be moved relative to the middle frame. The middle frame is connected to the rear frame through a middle frame joint, and the rear frame is connected to the subframe through the tipping joint.

The hooklift comprises a lock for locking the rear frame in parallel with the subframe when the hooklift is used to load the demountable platform from the ground onto the vehicle or to unload the demountable platform from the vehicle onto the ground. The hooklift comprises rear rollers that are mounted close to the tipping joint enabling the demountable platform to be easily moved with the hooklift during the loading and unloading of the demountable platform. Supporting beams provided to the underside of the demountable platform are intended to rest on the rear rollers. The hooklift comprises another lock for locking the middle frame in a parallel direction with the rear frame when the demountable platform is tipped. The hooklift may also comprise locks for locking the demountable platform to the hooklift when the demountable platform is transported by the vehicle.

In the method according to the invention the hooklift is used to lift the demountable platform from the ground onto the vehicle. This is done by locking the rear frame to the subframe and rotating with the main cylinder(s) the middle frame around the middle frame joint into a position where the hook can attach the demountable platform as the vehicle is reversed towards the demountable platform. After the hook is attached to the demountable platform, the middle frame is rotated by driving the main cylinder(s) inwards. As a result, the front end of the demountable platform rises off the ground. After a certain time, the demountable platform comes into contact with the rear rollers and also the back end of the demountable platform rises off the ground. The demountable platform is now supported by the hook and the rear rollers. The middle frame is rotated until it is essentially parallel with the rear frame. The position of the demountable platform on the tipping frame is adjusted by moving the sliding frame relative to the middle frame. The correct position depends on the length of the demountable platform, which length is determined during the lifting of the demountable platform with the method according to the invention.

An advantage of the method according to the invention is that the length of a demountable platform can be determined during the lifting of the demountable platform from the ground onto a vehicle, whereby the length information can be utilized in the positioning of the demountable platform into a correct position on the tipping frame. Another advantage of the method according to the invention is that it enables to determine the length of a demountable platform automatically, without assistance from a driver of the vehicle. Still another advantage of the method according to the invention is that it is quick and accurate, and easy to implement into a hooklift.

According to an embodiment of the invention the position and orientation information of the hooklift relative to the ground comprises the height of the rear rollers from the ground.

According to an embodiment of the invention the position and orientation information of the hooklift relative to the ground comprises the pitch of the hooklift.

According to an embodiment of the invention the moment when the demountable platform comes into contact with the rear rollers of the hooklift is determined by determining a force acting on a main cylinder of the hooklift and detecting a moment when an abrupt change occurs in said force. The detection of the moment when the demountable platform collides with the rear rollers is based on the finding that due to this collision the force acting on the main cylinder decreases rapidly by a certain amount. Thus, the moment when the demountable platform comes into contact with the rear rollers can be easily and accurately determined based on the abrupt change in the force acting on the main cylinder.

According to an embodiment of the invention the force acting on the main cylinder of the hooklift is determined based on pressures in a bottom chamber and a piston rod chamber of the main cylinder, a pressure in a hydraulic pump of a hydraulic system that is connected to and used to control the main cylinder, or a strain in the main cylinder. The pressure in the bottom and piston rod chambers, and in the hydraulic pump can be measured with pressure sensors, which are easy to install into the hooklift. The strain in the main cylinder can be measured with a strain gauge. The strain gauge can be arranged to measure the strain of a piston rod of the main cylinder.

According to an embodiment of the invention the moment when the demountable platform comes into contact with the rear rollers of the hooklift is determined by monitoring the rotation of the rear rollers. The rear rollers start to rotate when the demountable platform rests on the rear rollers and the main cylinder is driven inwards. The rotation of the rear rollers can be monitored, for example, with a rotation sensor attached to the rear roller or a non-contact sensor arranged in connection with the rear roller.

According to an embodiment of the invention the moment when the demountable platform comes into contact with the rear rollers of the hooklift is determined by using optical means. The optical means may comprise a digital video camera arranged in connection with the rear rollers and a signal processor for analysing the video signal received from the digital video camera to determine the moment when the demountable platform comes into contact with the rear rollers.

According to an embodiment of the invention the moment when the demountable platform comes into contact with the rear rollers of the hooklift is determined by acoustical means. The acoustical means may comprise a microphone arranged in connection with the rear rollers and a signal processor for analysing the sound signal received from the microphone to determine the moment when the demountable platform comes into contact with the rear rollers.

According to an embodiment of the invention the moment when the demountable platform comes into contact with the rear rollers of the hooklift is determined by measuring a strain of a rear roller shaft.

According to an embodiment of the invention the one or more physical quantities related to the position of the hooklift are selected from the group consisting of a position of a piston rod of a main cylinder, an angle between a middle frame and a subframe of the hooklift, an angle between the piston rod of the main cylinder and the middle frame of the hooklift, and a position of a hook of the hooklift. The position of the piston rod can be determined by using a displacement sensor to measure the stroke of the piston rod and/or an inclinometer to measure an angle of the piston rod. The angles between the middle frame and the subframe, and the piston rod and the middle frame can be determined by providing the middle frame, the subframe and the piston rod with inclinometers. The position of the hook can be determined by using a distance sensor and/or an inclinometer.

According to an example, the length of the demountable platform is calculated from the equation:

$$l = x_{contact} + \frac{h_{roll}}{\cos\left(\frac{\pi}{2} - a_{platform}\right)}$$

where $x_{contact}$ is the distance between the front end of the demountable platform and the rear rollers, $h_{roll}$ is the height of the rear rollers from the ground, and $a_{platform}$ is the angle of the demountable platform compared to the ground.

The present invention also relates to a system for determining the length of a demountable platform. The system according to the invention comprises a hooklift for lifting the demountable platform from the ground onto a vehicle, means for determining a moment when the demountable platform comes into contact with rear rollers of the hooklift, means for determining, at said moment, magnitudes of one or more physical quantities related to a position of the hooklift, and means for calculating the length of the demountable platform using the determined magnitudes of the one or more physical quantities and the position and orientation information of the hooklift relative to the ground.

An advantage of the system according to the invention is that the length of a demountable platform can be determined during the lifting of the demountable platform from the ground onto a vehicle, whereby the length information can be utilized in the positioning of the demountable platform into a correct position on the tipping frame. Another advantage of the system according to the invention is that it enables to determine the length of a demountable platform automatically, without assistance from a driver of the vehicle. Still another advantage of the system according to the invention is that it is easy to implement to a vehicle.

According to an embodiment of the invention the means for determining the moment when the demountable platform comes into contact with the rear rollers of the hooklift comprises at least one of the following: a pressure sensor for measuring a pressure in a bottom chamber of a main cylinder, a pressure sensor for measuring a pressure in a piston rod chamber of the main cylinder, a pressure sensor for measuring a pressure in a hydraulic pump of a hydraulic system connected to the main cylinder, a strain gauge for measuring a strain in the main cylinder, a rotation or non-contact sensor for measuring a rotation of the rear rollers, a digital video camera or microphone for monitoring the rear rollers, or a strain gauge for measuring a strain of a rear roller shaft.

According to an embodiment of the invention the means for determining the magnitudes of the one or more physical quantities related to the position of the hooklift comprises at least one of the following: a displacement sensor and/or an inclinometer for measuring a position of a piston rod of a main cylinder, inclinometers for measuring an angle between a middle frame and a subframe of the hooklift, inclinometers for measuring an angle between the piston rod of the main cylinder and the middle frame of the hooklift, and a distance sensor and/or an inclinometer for measuring a position of a hook of the hooklift.

The exemplary embodiments of the invention presented in this text are not interpreted to pose limitations to the applicability of the appended claims. The verb "to comprise" is used in this text as an open limitation that does not exclude the existence of also unrecited features. The features recited in the dependent claims are mutually freely combinable unless otherwise explicitly stated.

The exemplary embodiments presented in this text and their advantages relate by applicable parts to the method as well as the system according to the invention, even though this is not always separately mentioned.

DETAILED DESCRIPTION OF THE INVENTION

Now, referring to the figures the invention is described in more details.

Figure 1:
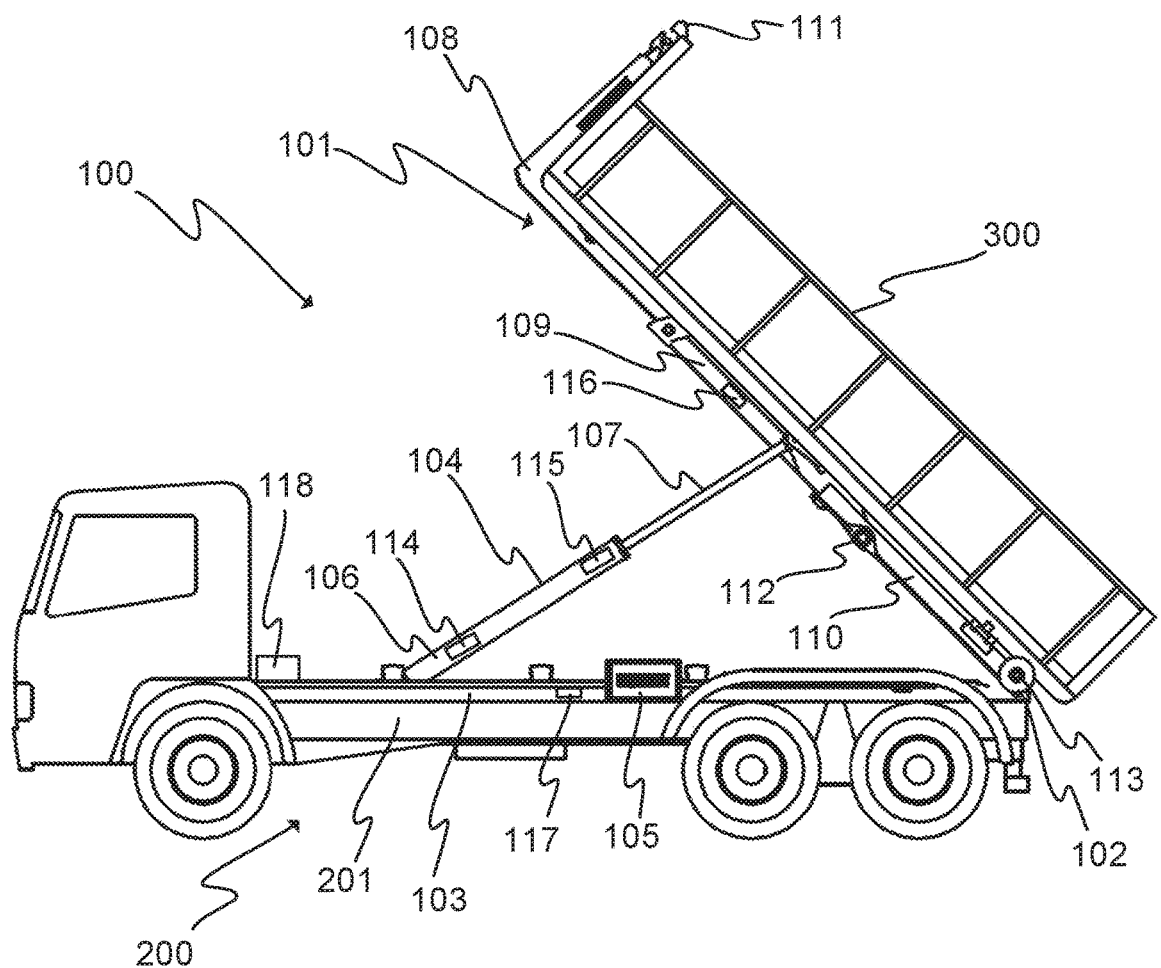
FIG. 1 illustrates an example of a hooklift assembled on a truck.

FIG. 1 illustrates an example of a hooklift 100 that is assembled on a truck 200. The hooklift 100 comprises a tipping frame 101, which is connected through a tipping joint 102 to a subframe 103 of the hooklift 100. The tipping frame 101 is arranged to be moved relative to the subframe 103 by two parallel main cylinders 104, which are controlled with a hydraulic system 105. The bottom sides 106 of the main cylinders 104 are attached to the subframe 103 and the piston rods 107 of the main cylinders 104 are attached to the tipping frame 101. The subframe 103 is attached to a chassis 201 of the truck 200.

The tipping frame 101 comprises a sliding frame 108, a middle frame 109 and a rear frame 110. The sliding frame 108 comprises a hook 111 with which the hooklift 100 is releasably attached to a demountable platform 300. The sliding frame 108 is connected to the middle frame 109 in such a manner that part of the sliding frame 108 is arranged inside the middle frame 109, and that the sliding frame 108 can be moved relative to the middle frame 109. The middle frame 109 is connected to the rear frame 110 through a middle frame joint 112, and the rear frame 110 is connected to the subframe 103 through the tipping joint 102. The hooklift 100 comprises locks (not shown in FIG. 1) with which the relative movement of parts of the hooklift 100 can be prevented. The hooklift 100 also comprises locks (not shown in FIG. 1) for locking the demountable platform 300 to the subframe 103 when the demountable platform 300 is transported by the truck 200.

During loading of the demountable platform 300 onto the truck 200 and unloading of the demountable platform 300 from the truck 200, the rear frame 110 is locked to the subframe 103, and the middle frame 109 is rotated around the middle frame joint 112 by using the main cylinders 104. Rear rollers 113 that are mounted close to the tipping joint 102 enable the demountable platform 300 to be easily moved with the hooklift 100 during the loading and unloading work tasks. During tipping and lowering of the demountable platform 300, the middle frame 109 is locked in parallel direction with the rear frame 110 (as shown in FIG. 1), and the rear frame 110 is rotated around the tipping joint 102 by using the main cylinders 104. The position of the demountable platform 300 on the tipping frame 101 can be changed by moving the sliding frame 108 relative to the middle frame 109.

The hooklift 100 comprises pressure sensors 114 and 115 for measuring a pressure in a bottom chamber and a piston rod chamber of the main cylinder 104, respectively. The force acting on the main cylinder 104 can be determined based on the pressures in the bottom and piston rod chambers. The moment when the demountable platform 300 comes into contact with the rear rollers 113 of the hooklift 100 can be detected based on an abrupt change in this force.

The hooklift 100 comprises inclinometers 116 and 117, which are attached to the middle frame 109 and the subframe 103, respectively. By using the inclinometers 116 and 117, an angle between the middle frame 109 and the subframe 103 can be determined, which angle varies as a function of the movement of the main cylinder 104.

The hooklift 100 comprises a data processing unit 118 for processing and storing the data received from the pressure sensors 114 and 115, and from the inclinometers 116 and 117. The data processing unit 118 is configured to determine the moment when the demountable platform 300 comes into contact with the rear rollers 113 of the hooklift 100 based on the pressure signals received from the pressure sensors 114 and 115, to store the angle between the middle frame 109 and the subframe 103 at said moment, and to calculate the length of the demountable platform 300 by using the determined angle and the height of the rear rollers 113 from the ground.

Figure 2A:
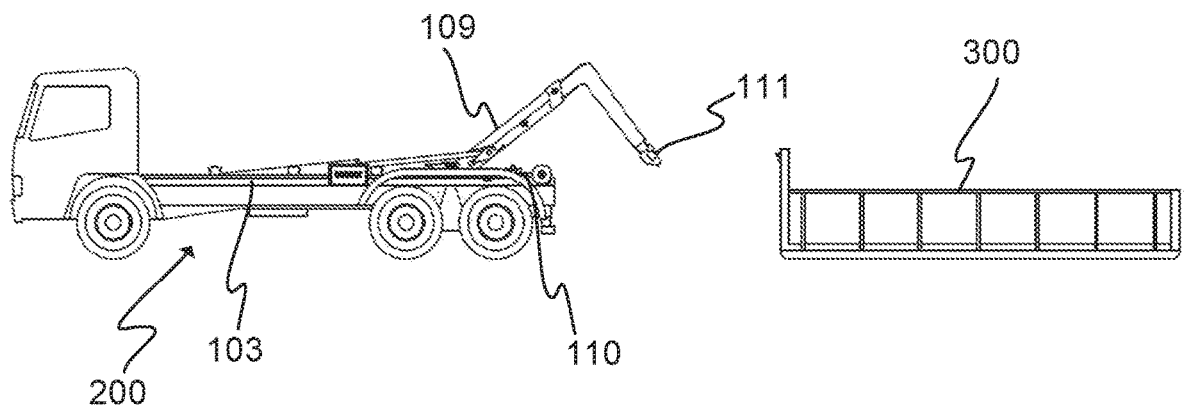
FIGS. 2A-2E illustrate the lifting of a demountable platform from the ground onto a truck.
Figure 2B:
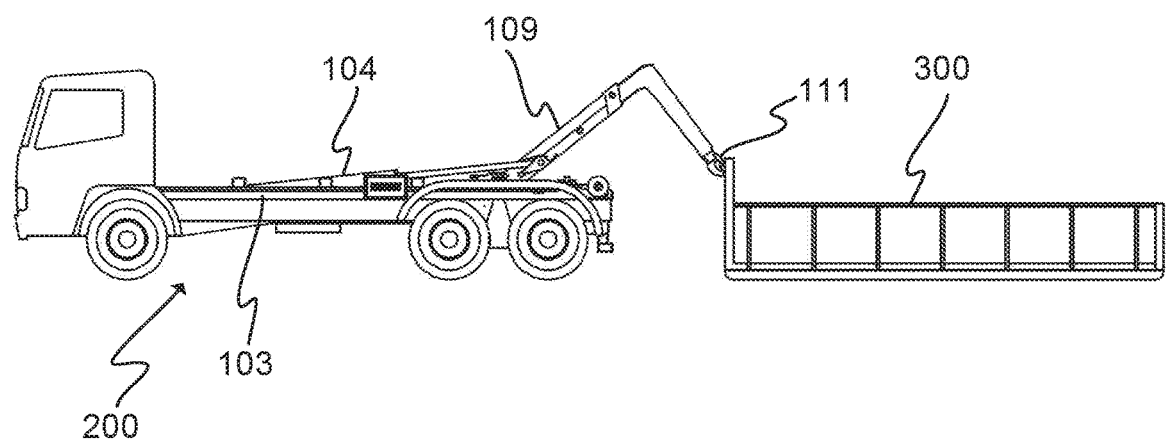

FIGS. 2A-2E illustrate the lifting of the demountable platform 300 from the ground onto the truck 200. In FIG. 2A, there is shown a situation where the truck 200 is reversed towards the demountable platform 300. The rear frame 110 is locked to the subframe 103, and the middle frame 109 is rotated to an angle where the hook 111 can attach to the demountable platform 300. The attachment of the hook 111 to the demountable platform 300 is shown in FIG. 2B. After the hook 111 is attached to the demountable platform 300, the lifting of the demountable platform 300 can be started by driving the main cylinders 104 inwards. As a result, the middle frame 109 rotates relative to the subframe 103, and the front end of the demountable platform 300 rises off the ground.

Figure 2C:
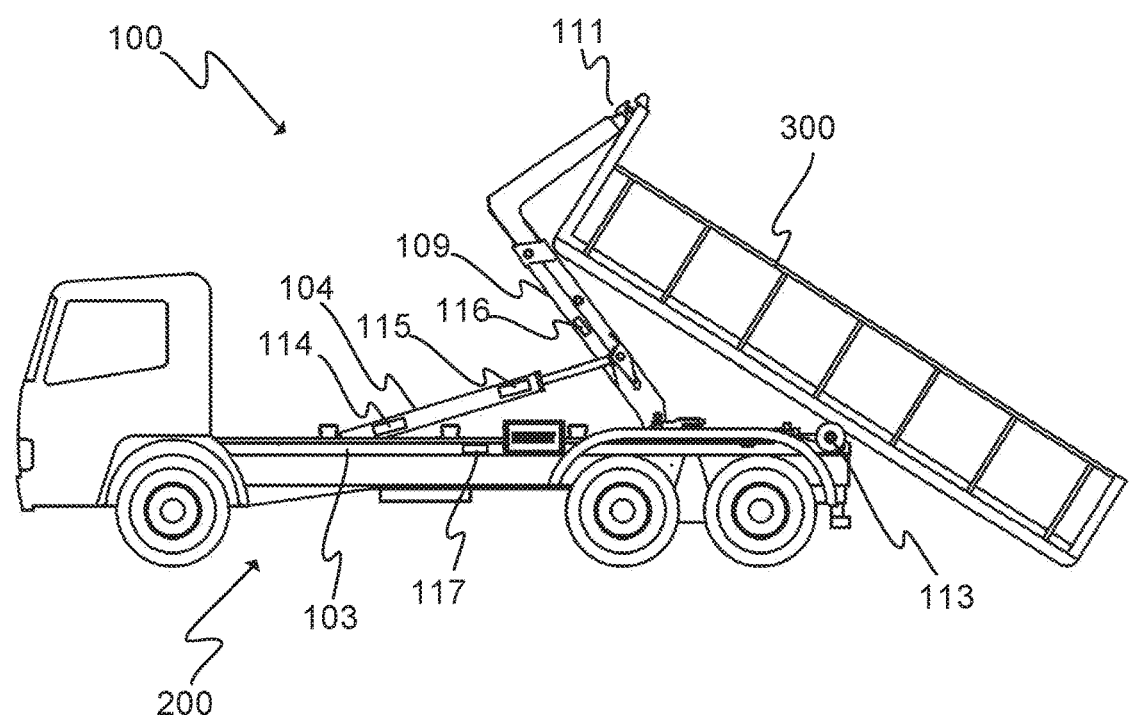

In FIG. 2C, there is shown a situation where the demountable platform 300 comes into contact with the rear rollers 113 of the hooklift 100. This moment is detected based on an abrupt change in the force acting on the main cylinder 104. This force is determined from the pressures in the bottom and piston rod chambers of the main cylinder 104. The pressures in the bottom and piston rod chambers are measured by the pressure sensors 114 and 115, respectively. An angle between the middle frame 109 and the subframe 103 is determined with inclinometers 116 and 117 when the demountable platform 300 touches the rear rollers 113. By using this information, the length of the demountable platform 300 can be calculated. When the main cylinders 104 are driven further inwards, also the back end of the demountable platform 300 rises off the ground, and the demountable platform 300 becomes supported by the hook 111 and the rear rollers 113.

Figure 2D:
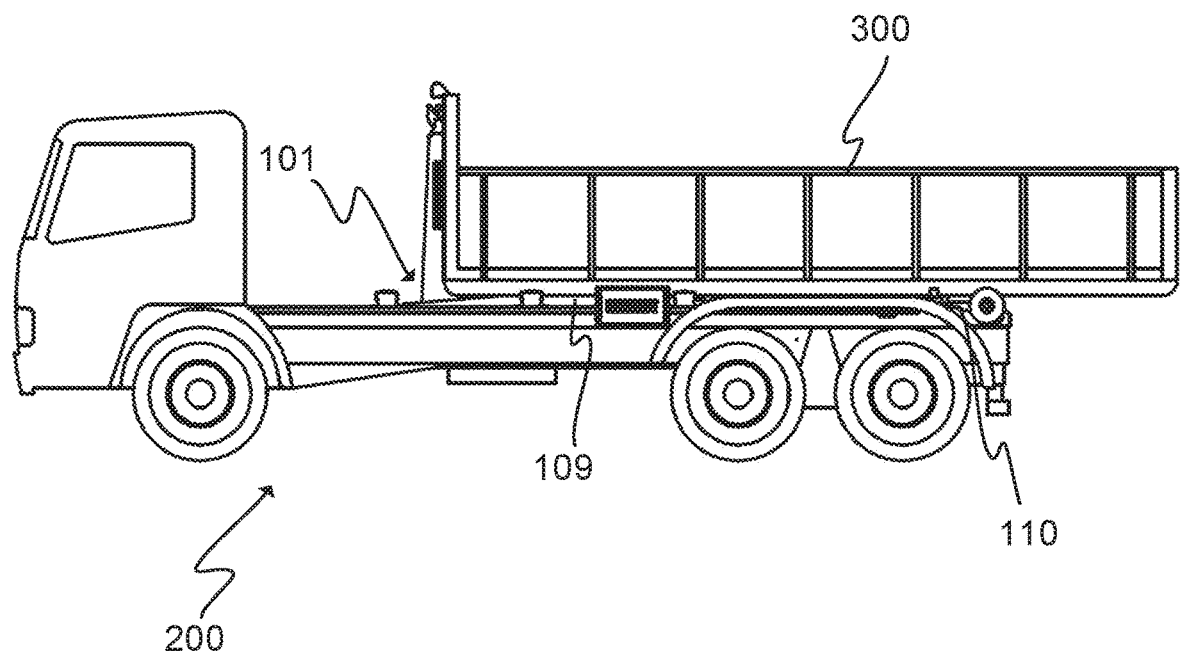
Figure 2E:
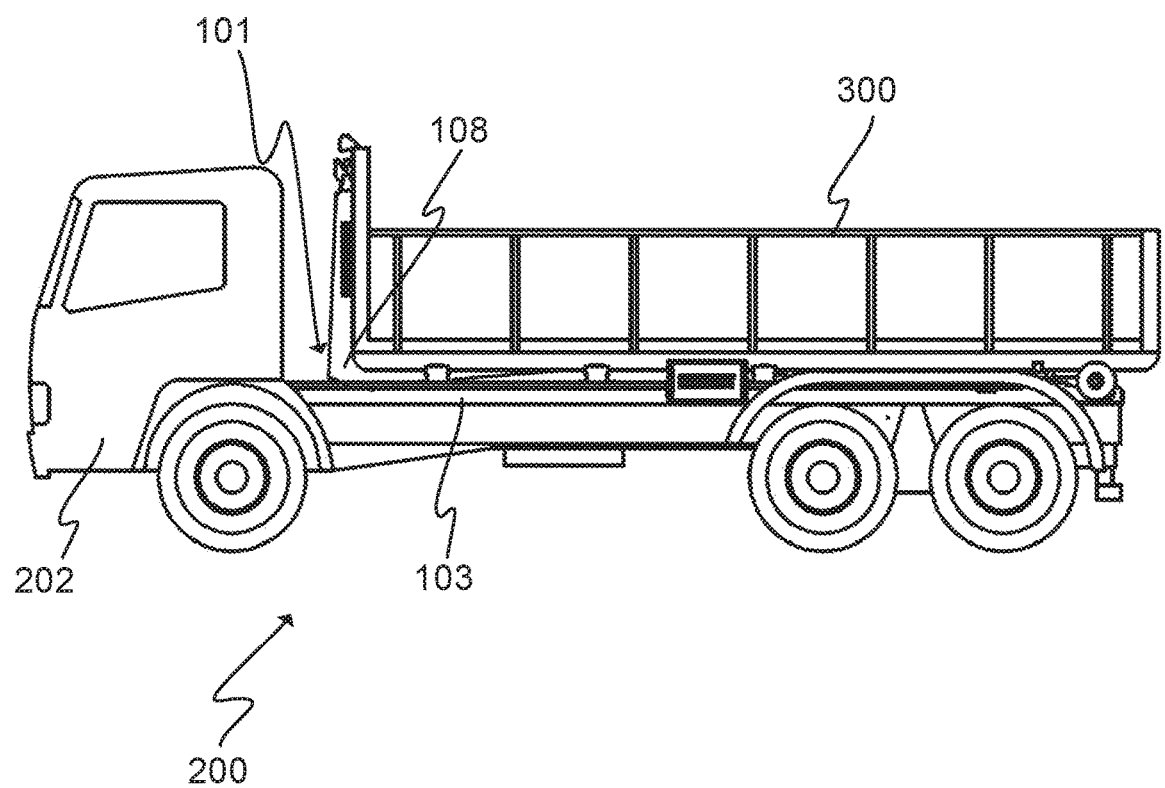

The middle frame 109 is rotated until it becomes essentially parallel with the rear frame 110. The demountable platform 300 rests now on the tipping frame 101. This situation is shown in FIG. 2D. Finally, the demountable platform 300 is moved with the sliding frame 108 closer to a cabin 202 of the truck 200, as shown in FIG. 2E. The length of the demountable platform 300 that was determined during the lifting process is used in positioning the demountable platform 300 into a correct position on the tipping frame 101. At this position the demountable platform 300 can be locked to the subframe 103.

Only advantageous exemplary embodiments of the invention are described in the figures. It is clear to a person skilled in the art that the invention is not restricted only to the examples presented above, but the invention may vary within the limits of the claims presented hereafter. Some possible embodiments of the invention are described in the dependent claims, and they are not to be considered to restrict the scope of protection of the invention as such.

The invention claimed is:

1. A method for determining the length of a demountable platform, comprising: using a hooklift to lift the demountable platform from the ground onto a vehicle, determining a moment when the demountable platform comes into contact with rear rollers of the hooklift, determining, at said moment, magnitudes of one or more physical quantities related to a position of the hooklift, and calculating the length of the demountable platform using the determined magnitudes of the one or more physical quantities and the position and orientation information of the hooklift relative to the ground.

2. The method according to claim 1, wherein the position and orientation information of the hooklift relative to the ground comprises the height of the rear rollers from the ground.

3. The method according to claim 1 wherein the position and orientation information of the hooklift relative to the ground comprises the pitch of the hooklift.

4. The method according to claim 1, wherein the moment when the demountable platform comes into contact with the rear rollers of the hooklift is determined by determining a force acting on a main cylinder of the hooklift and detecting a moment when an abrupt change occurs in said force.

5. The method according to claim 4, wherein the force acting on the main cylinder of the hooklift is determined based on pressures in a bottom chamber and a piston rod chamber of the main cylinder, a pressure in a hydraulic pump of a hydraulic system that is connected to and used to control the main cylinder, or a strain in the main cylinder.

6. The method according to claim 1, wherein the moment when the demountable platform comes into contact with the rear rollers of the hooklift is determined by monitoring the rotation of the rear rollers.

7. The method according to claim 1, wherein the moment when the demountable platform comes into contact with the rear rollers of the hooklift is determined by using optical means.

8. The method according to claim 1, wherein the moment when the demountable platform comes into contact with the rear rollers of the hooklift is determined by using acoustical means.

9. The method according to claim 1, wherein the moment when the demountable platform comes into contact with the rear rollers of the hooklift is determined by measuring a strain of a rear roller shaft.

10. The method according to claim 1, wherein the one or more physical quantities related to the position of the hooklift are selected from the group consisting of a position of a piston rod of a main cylinder, an angle between a middle frame and a subframe of the hooklift, an angle between the piston rod of the main cylinder and the middle frame of the hooklift, and a position of a hook of the hooklift.

11. A system for determining the length of a demountable platform, comprising: a hooklift for lifting the demountable platform from the ground onto a vehicle, means for determining a moment when the demountable platform comes into contact with rear rollers of the hooklift, means for determining, at said moment, magnitudes of one or more physical quantities related to a position of the hooklift, and means for calculating the length of the demountable platform using the determined magnitudes of the one or more physical quantities and the position and orientation information of the hooklift relative to the ground.

12. The system according to claim 11, wherein the means for determining the moment when the demountable platform comes into contact with the rear rollers of the hooklift comprises at least one of the following: a pressure sensor for measuring a pressure in a bottom chamber of a main cylinder, a pressure sensor for measuring a pressure in a piston rod chamber of the main cylinder, a pressure sensor for measuring a pressure in a hydraulic pump of a hydraulic system connected to the main cylinder, a strain gauge for measuring a strain in the main cylinder, a rotation or non-contact sensor for measuring a rotation of the rear rollers, a digital video camera or microphone for monitoring the rear rollers, or a strain gauge for measuring a strain of a rear roller shaft.

13. The system according to claim 11, wherein the means for determining the magnitudes of the one or more physical quantities related to the position of the hooklift comprises at least one of the following: a displacement sensor and/or an inclinometer for measuring a position of a piston rod of a main cylinder, inclinometers for measuring an angle between a middle frame and a subframe of the hooklift, inclinometers for measuring an angle between the piston rod of the main cylinder and the middle frame of the hooklift, and a distance sensor and/or an inclinometer for measuring a position of a hook of the hooklift.

* * * * *